(12) United States Patent
Barton (10) Patent No.: US 8,360,780 B2
(45) Date of Patent: Jan. 29, 2013

(54) METHOD AND SYSTEM FOR CREATING A MULTIPLICATION AND DIVISION PUZZLE

(76) Inventor: Lyndon O. Barton, Newark, DE (US)

(*) Notice: Subject to any disclaimer, the term of this patent is extended or adjusted under 35 U.S.C. 154(b) by 1398 days.

(21) Appl. No.: 11/703,817

(22) Filed: Feb. 8, 2007

(65) Prior Publication Data

US 2007/0255780 A1 Nov. 1, 2007

Related U.S. Application Data

(60) Provisional application No. 60/779,449, filed on Mar. 7, 2006.

(51) Int. Cl.
*G09B 23/02* (2006.01)
*G09B 1/00* (2006.01)
*G09B 19/22* (2006.01)
*G06F 7/52* (2006.01)

(52) U.S. Cl. ........ 434/209; 434/188; 434/191; 273/139; 273/148 R; 273/153 R; 273/240; 273/269; 273/272; 708/620

(58) Field of Classification Search .................. 434/209, 434/363, 364, 427; 273/148 R, 269
See application file for complete search history.

(56) References Cited

U.S. PATENT DOCUMENTS

| | | | | |
|---|---|---|---|---|
| 206,136 A | * | 7/1878 | Roche | 283/44 |
| 208,037 A | * | 9/1878 | Sawyer | 283/44 |
| 227,159 A | * | 5/1880 | Foote | 434/208 |
| 239,385 A | * | 3/1881 | Irwin | 434/207 |
| 262,191 A | * | 8/1882 | Wagner | 235/61 A |
| 389,415 A | * | 9/1888 | Smith | 434/191 |
| 438,757 A | * | 10/1890 | Bliss | 434/209 |
| 517,308 A | * | 3/1894 | Soulier | 235/87 R |
| 565,797 A | * | 8/1896 | Roller | 434/199 |
| 582,634 A | * | 5/1897 | Frew | 235/89 R |
| 602,954 A | * | 4/1898 | Osborne | 434/209 |
| 616,523 A | * | 12/1898 | Butler | 283/44 |
| 649,054 A | * | 5/1900 | Holibaugh | 434/209 |
| 680,411 A | * | 8/1901 | Dockery | 434/199 |
| 898,587 A | * | 9/1908 | Matthias | 434/208 |
| 938,737 A | * | 11/1909 | Aberle | 33/121 |
| 1,000,291 A | * | 8/1911 | Pettit | 283/44 |
| 1,151,171 A | * | 8/1915 | Fassett | 434/209 |
| 1,157,599 A | * | 10/1915 | Studebaker | 283/44 |
| 1,163,125 A | * | 12/1915 | Bechmann | 434/209 |
| 1,206,703 A | * | 11/1916 | Hawthorne | 235/87 R |
| 1,211,625 A | * | 1/1917 | Robbins | 434/209 |
| 1,228,889 A | * | 6/1917 | Eberhart | 434/205 |
| 1,289,743 A | * | 12/1918 | Hammond | 434/199 |
| 1,296,965 A | * | 3/1919 | Jones | 434/209 |
| 1,403,989 A | * | 1/1922 | Verneau | 434/208 |

(Continued)

FOREIGN PATENT DOCUMENTS

GB 2066547 A * 7/1981

*Primary Examiner* — Nikolai A Gishnock
(74) *Attorney, Agent, or Firm* — Wright IP & International Law (57) ABSTRACT

A multiplication and division puzzle and method of making thereof include a main table having a plurality of cells in rows and columns, the cells being filled with products and multipliers. A template having a plurality of cells that correspond to the plurality of cells in the main table has selected cells removed to form openings therein to reveal a set of product clues in the main table when the template is superimposed or laid thereon. The product clues include the products in the cells of the main table. The non-selected cells that remain in the template, concealing the multiplier answer and non-selected product answers in the main table. The main table and template are used to form a puzzle blank having a plurality of cells containing the set of product clues and empty cells for the user to fill in missing product answers. The main table contains all of the product and multiplier answers.

19 Claims, 9 Drawing Sheets

TEMPLATE GENERATION OF A DATA SET

U.S. PATENT DOCUMENTS

| | | | | |
|---|---|---|---|---|
| 1,436,997 A * | 11/1922 | McDade | | 434/354 |
| 1,509,889 A * | 9/1924 | Wheaton | | 283/44 |
| 1,527,663 A * | 2/1925 | Beery | | 235/89 R |
| 1,598,450 A * | 8/1926 | Ritter et al. | | 273/292 |
| 1,617,657 A * | 2/1927 | Studebaker | | 434/347 |
| 1,641,982 A * | 9/1927 | McDade | | 434/348 |
| 1,719,108 A * | 7/1929 | Fennell | | 273/123 R |
| 1,732,983 A * | 10/1929 | Orchard | | 235/89 R |
| 1,750,977 A * | 3/1930 | Thompson | | 434/354 |
| 1,751,106 A * | 3/1930 | Shelledy | | 235/89 R |
| 1,804,813 A * | 5/1931 | Reinhardt | | 235/85 R |
| 1,818,566 A * | 8/1931 | McDade | | 434/209 |
| 1,867,888 A * | 7/1932 | Obidine | | 434/209 |
| 1,884,676 A * | 10/1932 | Hendrie | | 434/347 |
| 1,932,994 A * | 10/1933 | Tucker | | 434/344 |
| 1,974,901 A * | 9/1934 | Stadler | | 434/199 |
| 2,090,037 A * | 8/1937 | Glenney | | 434/327 |
| 2,188,723 A * | 1/1940 | Posey | | 434/199 |
| 2,205,440 A * | 6/1940 | Schoenberg et al. | | 273/299 |
| 2,264,492 A * | 12/1941 | Weaver et al. | | 273/236 |
| 2,320,832 A * | 6/1943 | Schoenberg et al. | | 273/242 |
| 2,349,066 A * | 5/1944 | Witter | | 434/201 |
| 2,502,238 A * | 3/1950 | Wade et al. | | 434/208 |
| 2,512,837 A * | 6/1950 | Pescatori | | 434/201 |
| 2,585,458 A * | 2/1952 | Gordon | | 273/126 R |
| 2,654,963 A * | 10/1953 | Guillaume | | 434/207 |
| 2,656,618 A * | 10/1953 | Pescatori | | 434/201 |
| 2,714,261 A * | 8/1955 | Hight | | 434/199 |
| 2,769,640 A * | 11/1956 | Elder | | 273/269 |
| 2,839,844 A * | 6/1958 | Lehnkering | | 434/207 |
| 2,871,581 A * | 2/1959 | Guzak | | 273/236 |
| 2,901,839 A * | 9/1959 | Huff | | 434/207 |
| 2,910,786 A * | 11/1959 | Cohn et al. | | 434/348 |
| 2,966,747 A * | 1/1961 | Johnson | | 434/199 |
| 3,009,262 A * | 11/1961 | Joseph | | 434/201 |
| 3,172,599 A * | 3/1965 | Passerini | | 235/89 R |
| 3,224,114 A * | 12/1965 | Swanson | | 434/209 |
| 3,339,295 A * | 9/1967 | Wanvig | | 434/209 |
| 3,342,493 A * | 9/1967 | Lang | | 273/271 |
| 3,387,391 A * | 6/1968 | Bartolo | | 434/191 |
| 3,456,364 A * | 7/1969 | Colin | | 434/209 |
| 3,545,101 A * | 12/1970 | Fike | | 434/130 |
| 3,571,953 A * | 3/1971 | Hassell, Jr. | | 434/209 |
| 3,603,005 A * | 9/1971 | Dysart | | 434/209 |
| 3,618,951 A * | 11/1971 | Parrick et al. | | 273/240 |
| 3,661,392 A * | 5/1972 | Abney | | 273/293 |
| 3,735,504 A * | 5/1973 | Fedyna | | 434/199 |
| 3,808,708 A * | 5/1974 | Huskin | | 434/209 |
| 3,834,042 A * | 9/1974 | Henry | | 434/201 |
| 3,869,124 A * | 3/1975 | Stein et al. | | 273/242 |
| 3,935,649 A * | 2/1976 | Harte | | 434/195 |
| 3,947,035 A * | 3/1976 | Bouchard | | 273/126 R |
| 3,975,021 A * | 8/1976 | Brown | | 273/271 |
| 3,999,310 A * | 12/1976 | Lufkin et al. | | 434/208 |
| 4,015,345 A * | 4/1977 | Rice, Jr. | | 434/209 |
| 4,065,858 A * | 1/1978 | Harte | | 434/334 |
| 4,114,290 A * | 9/1978 | Cooper | | 434/200 |
| 4,258,477 A * | 3/1981 | Ishiyama | | 434/202 |
| 4,302,015 A * | 11/1981 | Bowser et al. | | 273/271 |
| 4,369,359 A * | 1/1983 | Mendoza | | 235/89 R |
| 4,445,865 A * | 5/1984 | Sellon | | 434/207 |
| 4,466,799 A * | 8/1984 | Argiro | | 434/203 |
| 4,688,797 A * | 8/1987 | Sebestyen | | 273/148 R |
| 4,703,933 A * | 11/1987 | Cahill et al. | | 273/139 |
| 4,728,294 A * | 3/1988 | Bredehorn | | 434/327 |
| 4,790,757 A * | 12/1988 | Takahashi | | 434/209 |
| 4,903,990 A * | 2/1990 | Crowdis | | 283/44 |
| 4,971,560 A * | 11/1990 | Patel | | 434/191 |
| 5,083,793 A * | 1/1992 | Sanford | | 273/249 |
| 5,098,301 A * | 3/1992 | Woods | | 434/195 |
| 5,102,341 A * | 4/1992 | Koslin | | 434/353 |
| 5,120,226 A * | 6/1992 | Tsai | | 434/195 |
| 5,161,978 A * | 11/1992 | Kahn | | 434/348 |
| 5,167,509 A * | 12/1992 | Guffrey | | 434/333 |
| 5,176,381 A * | 1/1993 | Winters | | 273/146 |
| 5,474,455 A * | 12/1995 | Yang | | 434/128 |
| 5,522,732 A * | 6/1996 | Roberts et al. | | 434/363 |
| 5,529,497 A * | 6/1996 | Bigold | | 434/191 |
| 5,545,042 A * | 8/1996 | Barrows | | 434/207 |
| 5,653,594 A * | 8/1997 | Lai | | 434/209 |
| 5,688,126 A * | 11/1997 | Merritt | | 434/128 |
| 5,759,041 A * | 6/1998 | Batten | | 434/209 |
| 5,769,639 A * | 6/1998 | Foster | | 434/159 |
| 5,893,718 A * | 4/1999 | O'Donnell | | 434/128 |
| 5,927,717 A * | 7/1999 | Berkovi et al. | | 273/271 |
| 5,927,718 A * | 7/1999 | Heaton | | 273/272 |
| 5,997,305 A * | 12/1999 | Mangles | | 434/209 |
| 6,077,079 A * | 6/2000 | Barnes | | 434/128 |
| 6,079,710 A * | 6/2000 | Brown | | 273/269 |
| 6,079,983 A * | 6/2000 | Kane, Jr. | | 434/209 |
| 6,089,871 A * | 7/2000 | Jaffe | | 434/209 |
| 6,116,603 A * | 9/2000 | Huang | | 273/269 |
| 6,579,101 B2 * | 6/2003 | Phan | | 434/188 |
| 6,695,618 B2 * | 2/2004 | Donn | | 434/209 |
| 6,716,033 B1 * | 4/2004 | Lassowsky | | 434/205 |
| 6,755,658 B2 * | 6/2004 | Frieman | | 434/191 |
| 6,769,914 B2 * | 8/2004 | Sundararajan | | 434/191 |
| 7,097,174 B2 * | 8/2006 | Darling | | 273/292 |
| 7,243,919 B2 * | 7/2007 | Ringuette | | 273/299 |
| D549,288 S * | 8/2007 | Droznika | | D21/341 |
| 7,364,431 B2 * | 4/2008 | Schwartz | | 434/209 |
| 7,413,440 B1 * | 8/2008 | Kennon | | 434/207 |
| 7,431,295 B2 * | 10/2008 | Scrymgeour et al. | | 273/139 |
| 7,458,580 B2 * | 12/2008 | Martineck et al. | | 273/139 |
| 7,677,895 B2 * | 3/2010 | Miller | | 434/188 |
| 7,708,634 B2 * | 5/2010 | Padgett | | 463/19 |
| 7,749,067 B2 * | 7/2010 | Frain | | 463/19 |
| 2002/0015936 A1 * | 2/2002 | Donn | | 434/209 |
| 2006/0134588 A1 * | 6/2006 | Hawley | | 434/188 |
| 2007/0105077 A1 * | 5/2007 | Pechter | | 434/188 |
| 2007/0248939 A1 * | 10/2007 | Miller | | 434/188 |
| 2008/0171309 A1 * | 7/2008 | Volpe | | 434/198 |
| 2008/0176195 A1 * | 7/2008 | Alvarado | | 434/188 |
| 2009/0047642 A1 * | 2/2009 | Beatty et al. | | 434/191 |

\* cited by examiner

| X | 4 | 10 | 8 | 11 | 9 | 6 | 12 | 7 | ⑤ | 2 | 3 |
|---|---|---|---|---|---|---|---|---|---|---|---|
| 12 | 48 | 120 | 96 | 132 | 108 | 72 | 144 | 84 | 60 | 24 | 36 |
| 10 | 40 | 100 | 80 | 110 | 90 | 60 | 120 | 70 | 50 | 20 | 30 |
| 8 | 32 | 80 | 64 | 88 | 72 | 48 | 96 | 56 | 40 | 16 | 24 |
| ⑥ | 24 | 60 | 48 | 66 | 54 | 36 | 72 | 42 | ㉚ | 12 | 18 |
| 11 | 44 | 110 | 88 | 121 | 99 | 66 | 132 | 77 | 55 | 22 | 33 |
| 9 | 36 | 90 | 72 | 99 | 81 | 54 | 108 | 63 | 45 | 18 | 27 |
| ③ | 12 | 30 | 24 | 33 | 27 | 18 | 36 | 21 | ⑮ | 6 | 9 |
| 7 | 28 | 70 | 56 | 77 | 63 | 42 | 84 | 49 | 35 | 14 | 21 |
| 4 | 16 | 40 | 32 | 44 | 36 | 24 | 48 | 28 | 20 | 8 | 12 |
| 5 | 20 | 50 | 40 | 55 | 45 | 30 | 60 | 35 | 25 | 10 | 15 |
| 2 | 8 | 20 | 16 | 22 | 18 | 12 | 24 | 14 | 10 | 4 | 6 |

FIGURE 1A - MAIN TABLE

| X | 4 | 10 | 8 | 11 | 9 | 6 | 12 | 7 | 5 | 2 | 3 | 4 | 10 | 8 | 11 | 9 | 6 | 12 | 7 | 5 | 2 | 3 |
|---|---|---|---|---|---|---|---|---|---|---|---|---|---|---|---|---|---|---|---|---|---|---|
| 12 | 48 | 120 | 96 | 132 | 108 | 72 | 144 | 84 | 60 | 24 | 36 | 48 | 120 | 96 | 132 | 108 | 72 | 144 | 84 | 60 | 24 | 36 |
| 10 | 40 | 100 | 80 | 110 | 90 | 60 | 120 | 70 | 50 | 20 | 30 | 40 | 100 | 80 | 110 | 90 | 60 | 120 | 70 | 50 | 20 | 30 |
| 8 | 32 | 80 | 64 | 88 | 72 | 48 | 96 | 56 | 40 | 16 | 24 | 32 | 80 | 64 | 88 | 72 | 48 | 96 | 56 | 40 | 16 | 24 |
| 6 | 24 | 60 | 48 | 66 | 54 | 36 | 72 | 42 | 30 | 12 | 18 | 24 | 60 | 48 | 66 | 54 | 36 | 72 | 42 | 30 | 12 | 18 |
| 11 | 44 | 110 | 88 | 121 | 99 | 66 | 132 | 77 | 55 | 22 | 33 | 44 | 110 | 88 | 121 | 99 | 66 | 132 | 77 | 55 | 22 | 33 |
| 9 | 36 | 90 | 72 | 99 | 81 | 54 | 108 | 63 | 45 | 18 | 27 | 36 | 90 | 72 | 99 | 81 | 54 | 108 | 63 | 45 | 18 | 27 |
| 3 | 12 | 30 | 24 | 33 | 27 | 18 | 36 | 21 | 15 | 6 | 9 | 12 | 30 | 24 | 33 | 27 | 18 | 36 | 21 | 15 | 6 | 9 |
| 7 | 28 | 70 | 56 | 77 | 63 | 42 | 84 | 49 | 35 | 14 | 21 | 28 | 70 | 56 | 77 | 63 | 42 | 84 | 49 | 35 | 14 | 21 |
| 4 | 16 | 40 | 32 | 44 | 36 | 24 | 48 | 28 | 20 | 8 | 12 | 16 | 40 | 32 | 44 | 36 | 24 | 48 | 28 | 20 | 8 | 12 |
| 5 | 20 | 50 | 40 | 55 | 45 | 30 | 60 | 35 | 25 | 10 | 15 | 20 | 50 | 40 | 55 | 45 | 30 | 60 | 35 | 25 | 10 | 15 |
| 2 | 8 | 20 | 16 | 22 | 18 | 12 | 24 | 14 | 10 | 4 | 6 | 8 | 20 | 16 | 22 | 18 | 12 | 24 | 14 | 10 | 4 | 6 |
| 12 | 48 | 120 | 96 | 132 | 108 | 72 | 144 | 84 | 60 | 24 | 36 | 48 | 120 | 96 | 132 | 108 | 72 | 144 | 84 | 60 | 24 | 36 |
| 10 | 40 | 100 | 80 | 110 | 90 | 60 | 120 | 70 | 50 | 20 | 30 | 40 | 100 | 80 | 110 | 90 | 60 | 120 | 70 | 50 | 20 | 30 |
| 8 | 32 | 80 | 64 | 88 | 72 | 48 | 96 | 56 | 40 | 16 | 24 | 32 | 80 | 64 | 88 | 72 | 48 | 96 | 56 | 40 | 16 | 24 |
| 6 | 24 | 60 | 48 | 66 | 54 | 36 | 72 | 42 | 30 | 12 | 18 | 24 | 60 | 48 | 66 | 54 | 36 | 72 | 42 | 30 | 12 | 18 |
| 11 | 44 | 110 | 88 | 121 | 99 | 66 | 132 | 77 | 55 | 22 | 33 | 44 | 110 | 88 | 121 | 99 | 66 | 132 | 77 | 55 | 22 | 33 |
| 9 | 36 | 90 | 72 | 99 | 81 | 54 | 108 | 63 | 45 | 18 | 27 | 36 | 90 | 72 | 99 | 81 | 54 | 108 | 63 | 45 | 18 | 27 |
| 3 | 12 | 30 | 24 | 33 | 27 | 18 | 36 | 21 | 15 | 6 | 9 | 12 | 30 | 24 | 33 | 27 | 18 | 36 | 21 | 15 | 6 | 9 |
| 7 | 28 | 70 | 56 | 77 | 63 | 42 | 84 | 49 | 35 | 14 | 21 | 28 | 70 | 56 | 77 | 63 | 42 | 84 | 49 | 35 | 14 | 21 |
| 4 | 16 | 40 | 32 | 44 | 36 | 24 | 48 | 28 | 20 | 8 | 12 | 16 | 40 | 32 | 44 | 36 | 24 | 48 | 28 | 20 | 8 | 12 |
| 5 | 20 | 50 | 40 | 55 | 45 | 30 | 60 | 35 | 25 | 10 | 15 | 20 | 50 | 40 | 55 | 45 | 30 | 60 | 35 | 25 | 10 | 15 |
| 2 | 8 | 20 | 16 | 22 | 18 | 12 | 24 | 14 | 10 | 4 | 6 | 8 | 20 | 16 | 22 | 18 | 12 | 24 | 14 | 10 | 4 | 6 |

FIGURE 1B - MAIN TABLE (EXPANDED)

FIGURE 2 - TEMPLATE

FIGURE 3 - TEMPLATE GENERATION OF A DATA SET

FIGURE 4 - GENERATED PUZZLE BLANK

FIGURE 5 - COMPLETED PUZZLE

OTHER PUZZLE BLANKS

METHOD AND SYSTEM FOR CREATING A MULTIPLICATION AND DIVISION PUZZLE

This application claims priority to Applicant's co-pending U.S. Provisional Application Ser. No. 60/779,449 entitled "METHOD AND SYSTEM FOR CREATING A MULTIPLICATION AND DIVISION PUZZLE" filed Mar. 7, 2006. The entirety of each of this patent application is incorporated herein by reference.

BACKGROUND OF INVENTION

1. Field of the Invention

One of the challenges for students to successfully perform elementary mathematics is multiplication and the mastery of the multiplication table. The difficulty for some mathematics students to master the multiplication table, and therefore, understand basic multiplication, results in the students relying heavily on calculators to perform rudimentary computations. As a result, many students cannot perform basic mental arithmetic. Basic mental arithmetic is essential to the mastery of fractions, for example, where the student must determine common denominators and common multiples, and factor numbers.

2. Description of the Related Art

Existing multiplication tables have numbers or multipliers that are arranged in sequential order and merely require a linear thought process to determine the product or quotient to solve. As a result, a user of the existing multiplication tables does not determine the product and quotient as they would under real-life conditions, where the numbers are random.

There is an unmet need in the art for a method and system for creating a multiplication tool that helps teach students how to perform elementary mathematics, master the multiplication table, and otherwise provide a user-friendly approach for assisting students with multiplication.

One approach that is helpful to the student in learning and mastering the multiplication table is to employ a modified version of the multiplication table, as disclosed and described herein, which is designed as a learning tool in the form of a puzzle for practice as well as for fun.

SUMMARY OF THE INVENTION

The present invention includes a method and system in which a student or user can learn and master multiplication and division. The present invention also includes a method and system in which a user can learn and master multiplication and division over a network, such as the Internet. In an embodiment of the present invention, the user accesses a website comprising the multiplication and division puzzle.

The present invention is directed to a learning tool in the form of a puzzle that teaches and reinforces basic multiplication and division skills, while providing an enjoyable activity for the user.

In an embodiment of the present invention, the puzzle comprises three elements: a main table in the form of a grid, a template, and a puzzle blank. The main table is formulated with a plurality of cells. The cells in a first row and a first column of the main table are filled with numbers that represent multipliers. The remaining cells are filled with numbers that represent the products at the intersection of the row and column multipliers. The numbers in the main table serve as a data bank for generating the puzzle blank.

The template also has a plurality of cells identical in shape or form to the main table, except that the template contains no numbers. Selected cells in the template are cut out to form openings or windows, so that when the template is superimposed or overlaid on the main table, the openings or windows reveal selected product cells in the main table while the remaining product cells are hidden from view. The template can also be the same size as the main table or smaller.

The puzzle blank is formed as a result of the overlay of the template on the main table or grid. The puzzle blank can be identical in form to the main grid, except that selected product cells are filled in, while remaining product and multiplier cells are empty. The template is superimposed over the main table to reveal through selected cells, product and multiplier clues to solving the puzzle, while the remaining cells of the template cover or conceal the answers in the data bank in the main table. The revealed product clues from the main table form the puzzle blank. The hidden product and multiplier cells, or non-selected cells, contain the product and multiplier answers. The user solves the puzzle by filling in the empty product and multiplier cells of the puzzle blank with the correct products and/or multipliers.

In accordance with an embodiment of the present invention, the user fills in the empty cells with the appropriate products and multipliers, in order to complete the puzzle.

Example embodiments of the present invention have now been described in accordance with the above advantages. It will be appreciated that these examples are merely illustrative of the invention. Many variations and modifications will be apparent to those skilled in the art.

BRIEF DESCRIPTION OF THE DRAWINGS

FIG. 1B is an example of an expanded main table in accordance with an embodiment of the present invention;

DETAILED DESCRIPTION OF THE INVENTION

Figure 1A:
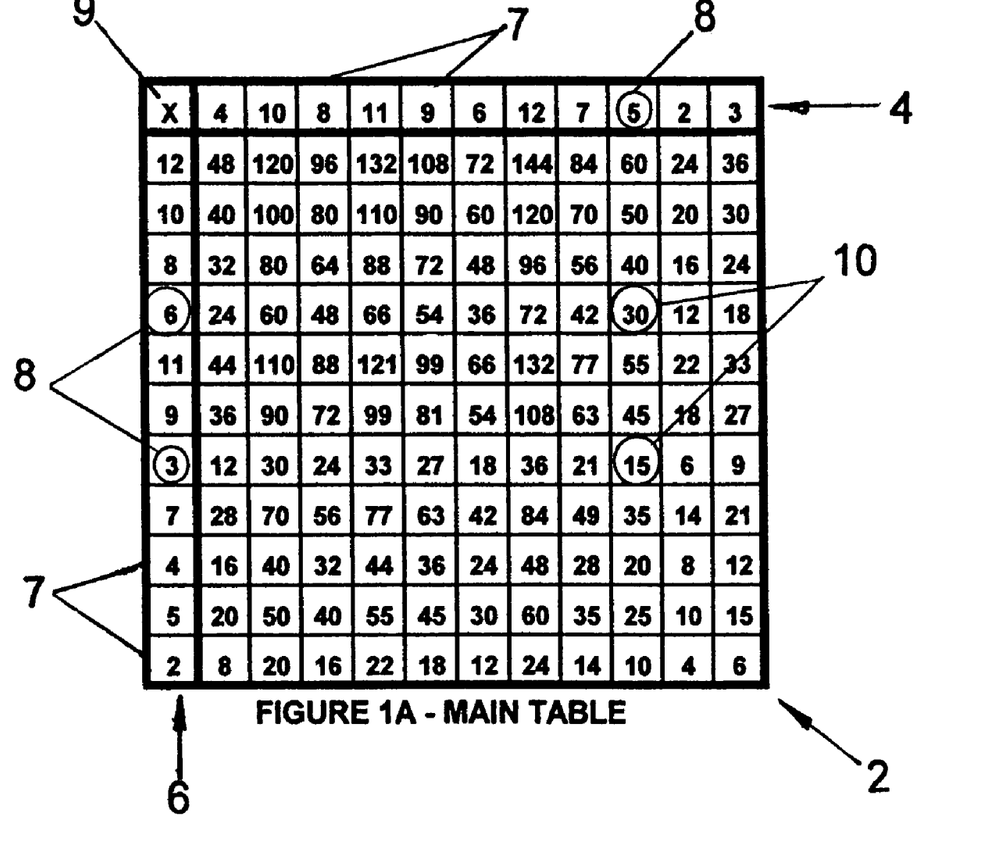
FIG. 1A is an example of the main table in accordance with an embodiment of the present invention.

FIG. 1A shows an exemplary multiplication table as a main table 2. The main table 2 is in the form of a grid having a plurality of rows and columns. Multipliers 8 fill the cells 7 of the first row 4 and the first column 6, for example, as shown in FIG. 1A. The intersection of the first row and first column contains a multiplication sign 9. Products 10 of the multipliers 8 in the rows and columns fill the remaining cells 7. In FIG. 1A, for example, the multipliers 8 are shown as numbers ranging from 2 through 12 and the products 10 are calculated by multiplying the multipliers 8 where they intersect in the grid. The multipliers 8 as illustrated in FIG. 1A, for example, are randomly arranged to avoid any discernable patterns in the resulting multiplication products located at the intersecting cells 7 of the respective multipliers in the first row and first column. The multipliers 8 can be also sequentially arranged. A multiplier 8 can be any real number, positive or negative, or an algebraic quantity.

The main table can also be formed from a plurality of smaller identical tables. As shown in FIG. 1B, for example, four smaller identical tables 14a, 14b, 14c and 14d containing the multipliers 8 and the respective products 10 can be combined to form an expanded main table 14. Each of the four tables 14a, 14b, 14c and 14d of the expanded main table 14 in FIG. 1B are identical to the main table 2 in FIG. 1A.

The main table 2, 14 is designed to serve as a data bank from which different sets of data for the puzzle can be generated, using a template 16 shown in FIG. 2, discussed below.

Figure 2:
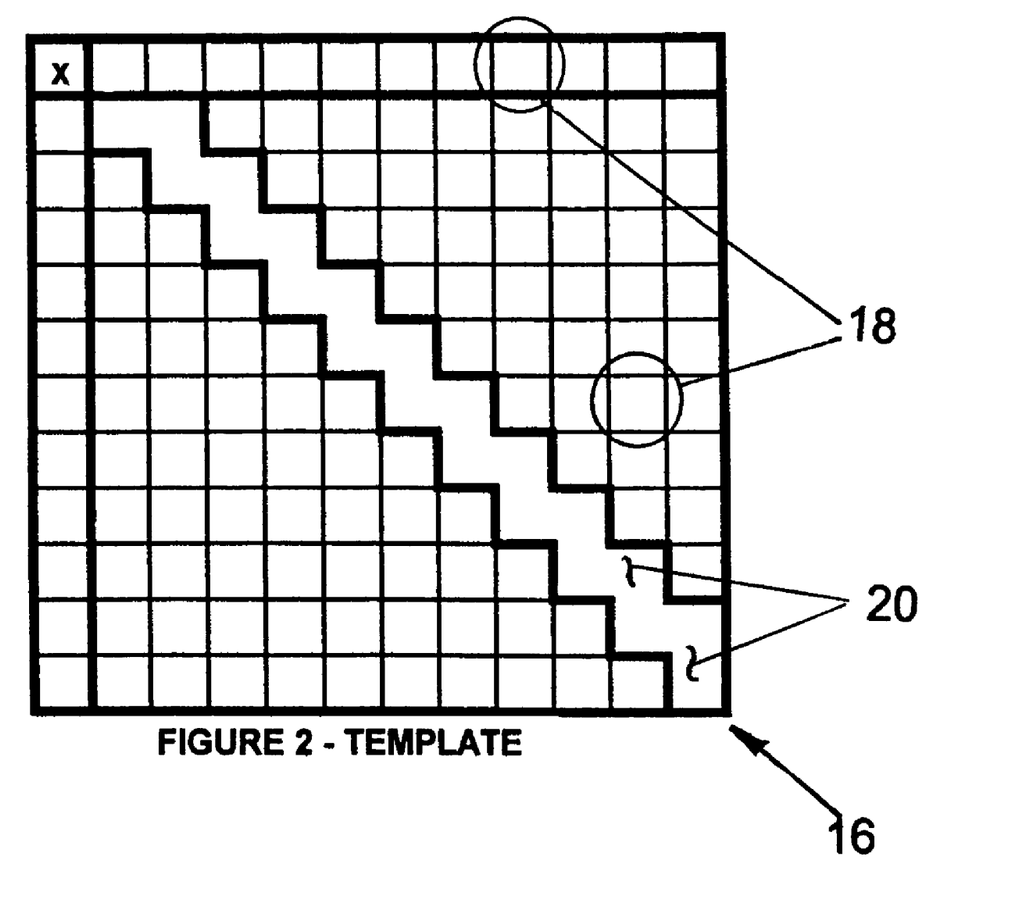
FIG. 2 is an example of the template in accordance with an embodiment of the present invention.
Figure 3:
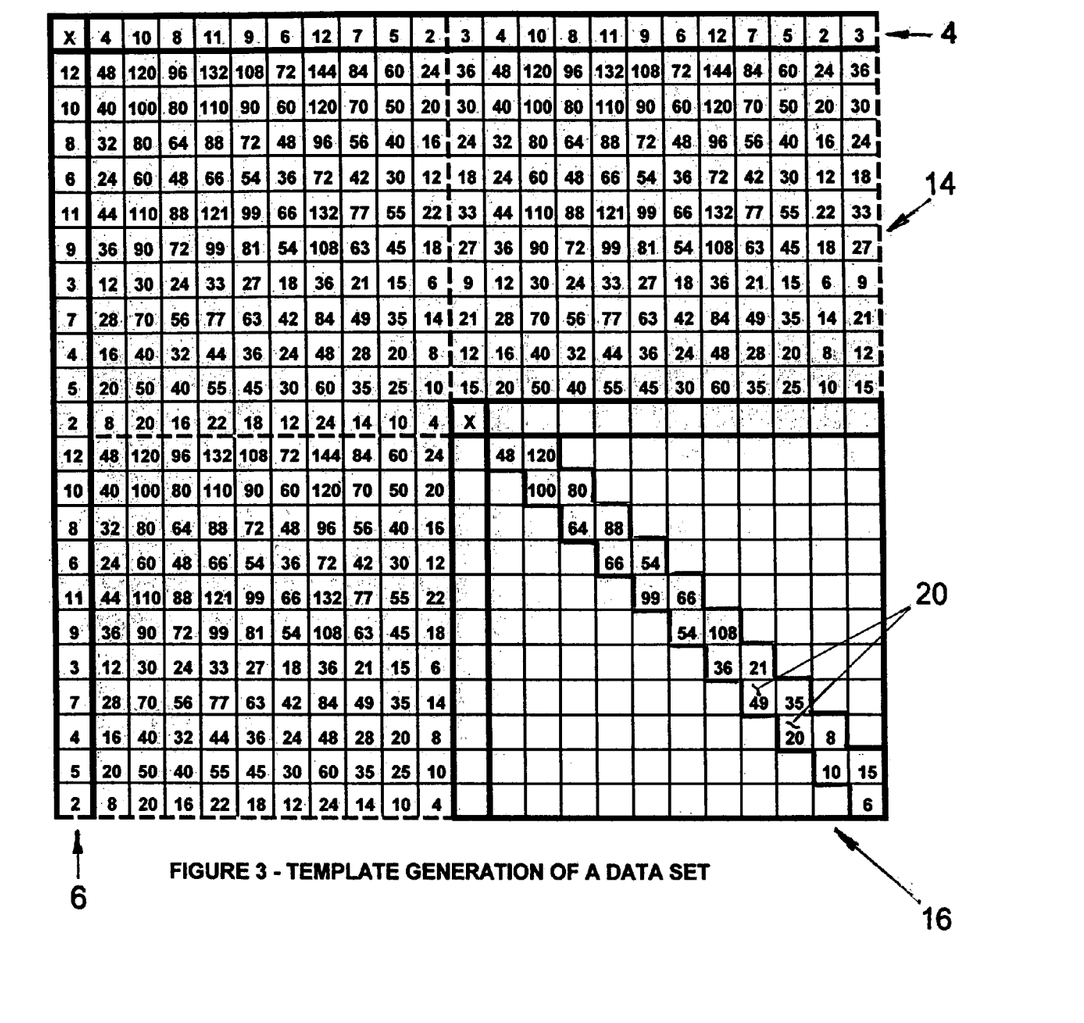
FIG. 3 is an example of the template generation of a data set in accordance with an embodiment of the present invention.

The cells 18 of the template 16 as shown in FIG. 2, for example, match the form of the cells 7 of the main table 2, 14 and have selected cells that are removed or cut out to form openings or windows 20, while other cells 18 remain empty. The openings or windows 20 are configured so that when the template 16 is superimposed or overlaid on the main table 2, 14 as shown, for example, with the main table 14 in FIG. 3, the openings 20 permit selected sets of product clues in the data bank of the main table to be exposed therethrough, while the remaining product and multiplier answers are covered or concealed, and thereby blocked from the user's view. The template 16 can have openings in the form of, for example, the diagonal patterns as shown in FIG. 3. The template can also have openings 20 in the form of, for example, a rectangular pattern, a triangular pattern, a diamond shaped pattern or a random pattern in order to vary the complexity of the puzzle.

Figure 4:
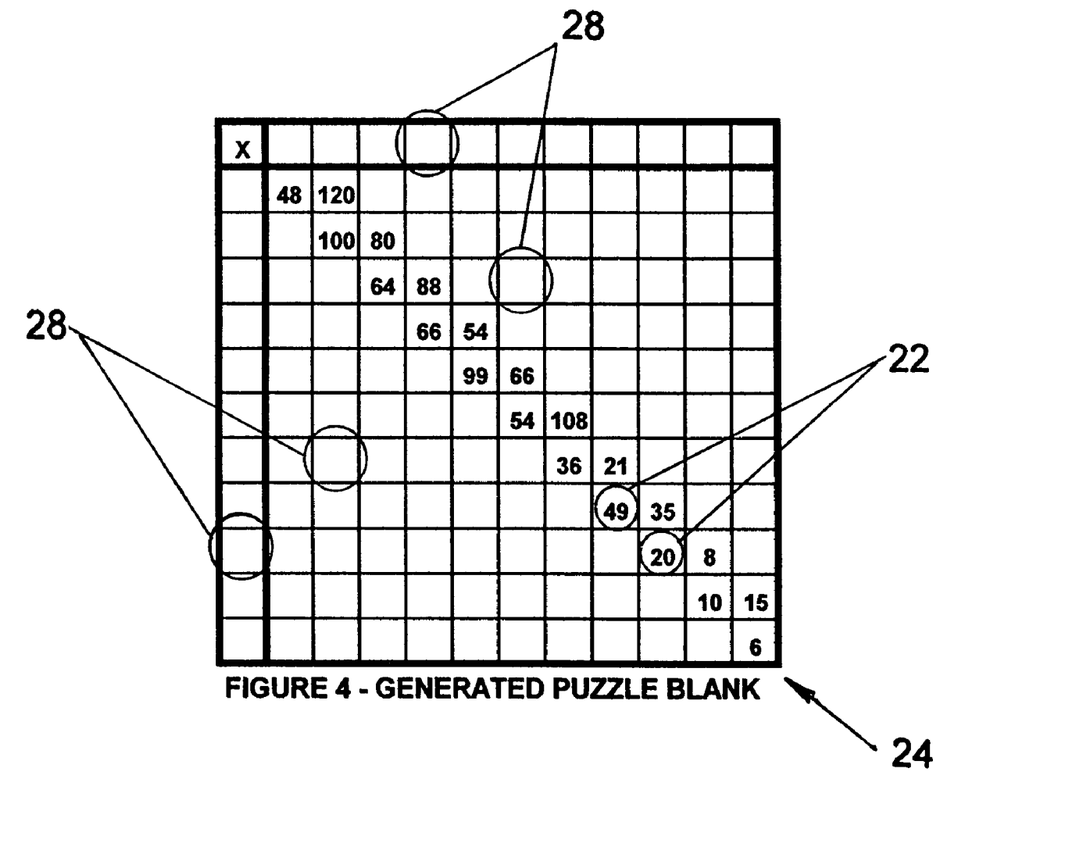
FIG. 4 is an example of the generated puzzle blank, in accordance with an embodiment of the present invention.

Thus, by laying the template 16 on the main table 2, 14 at different locations, a variety of data sets for the puzzle can be generated. FIG. 4 illustrates an example of the resulting puzzle blank 24 for the user to complete. The puzzle of FIG. 4 has a diagonally arranged set of product clues 22 in puzzle blank cells 26. The user must use multiplication and division skills in order to fill in the empty puzzle blank cells 28 with the correct product answers and multiplier answers to solve the puzzle.

Figure 5:
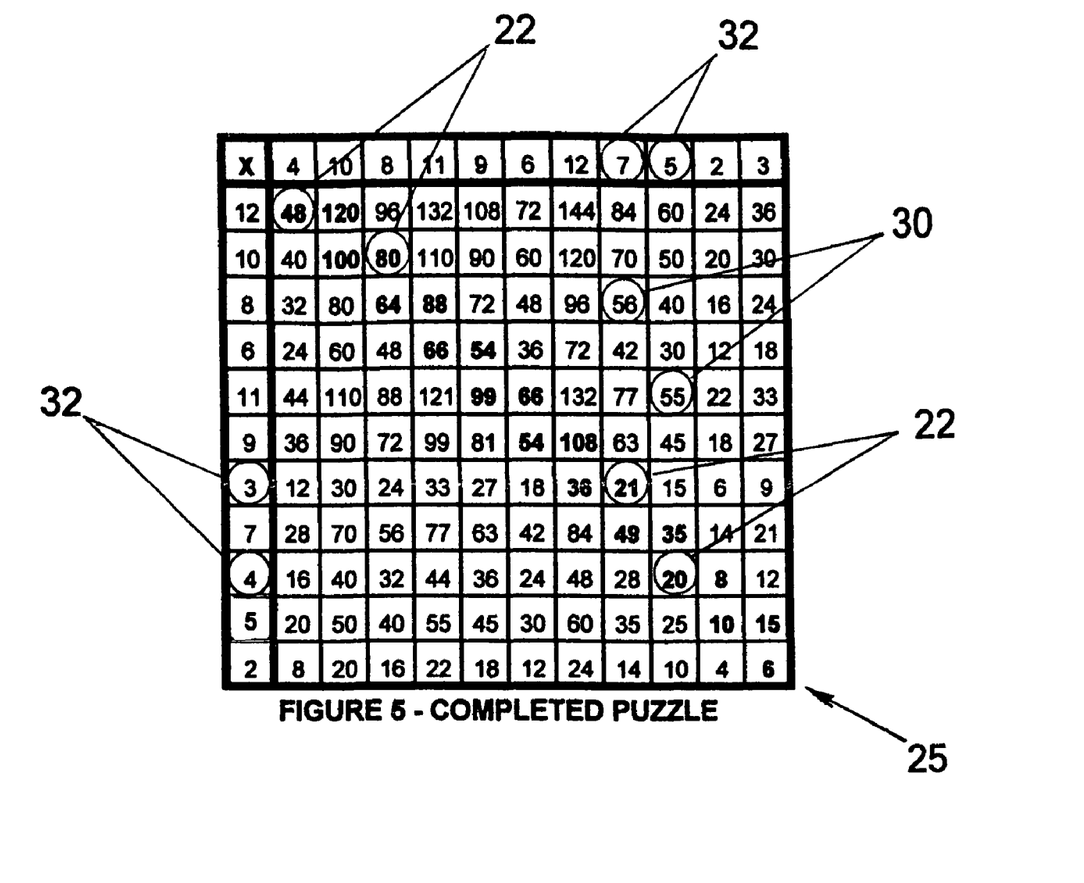
FIG. 5 is an example of the completed puzzle in accordance with an embodiment of the present invention.

FIG. 5 illustrates the completed puzzle 25 of FIG. 4 in which the product answers 30 and multiplier answers 32 have been filled in by the user.

Figure 6A:
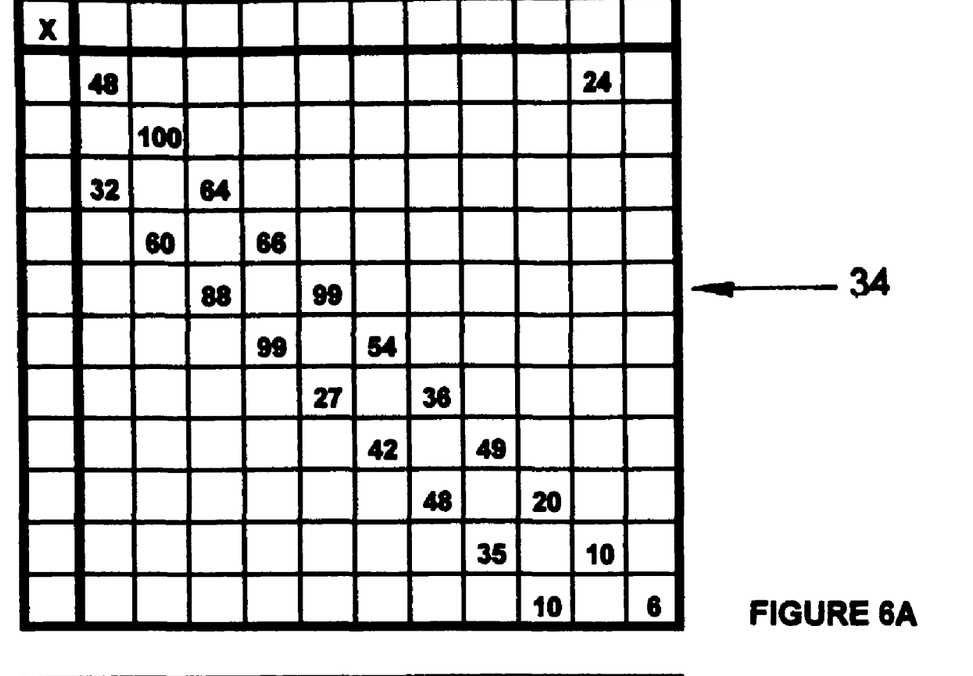
FIGS. 6A and 6B are other examples of template configurations of puzzle blanks, in accordance with an embodiment of the present invention.
Figure 6B:
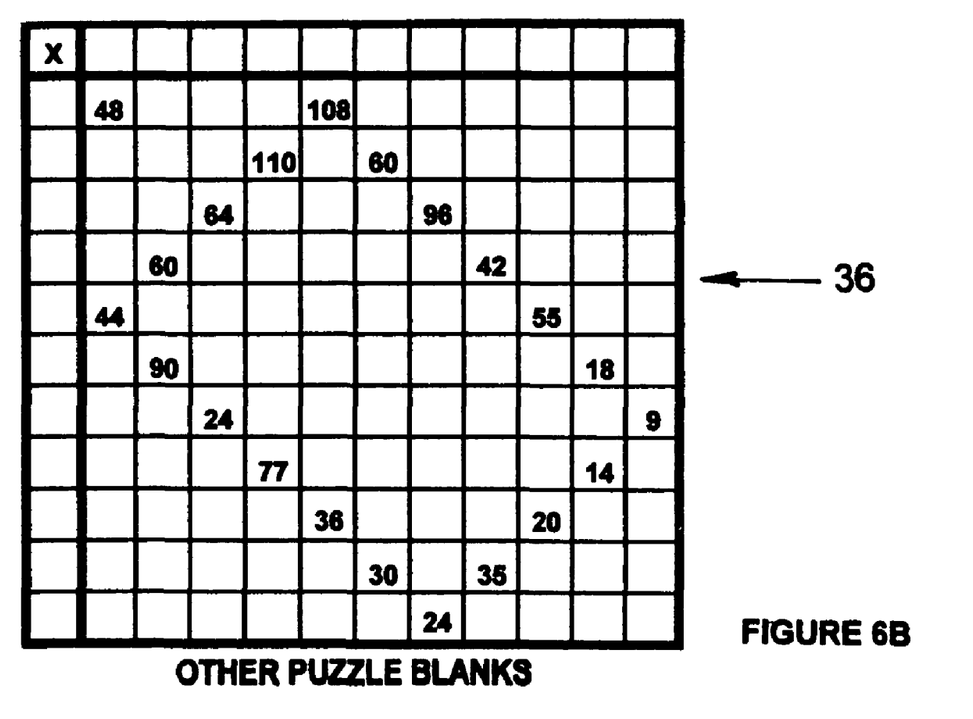

Other methods of selecting the data sets to generate the puzzle blank include, for example, electronic means, such as a program that randomly selects different products for the puzzle blank. Also, by altering the configurations of the cut outs in the template, other versions of the puzzle with varying degrees of difficulty can be generated, as shown in FIGS. 6A and 6B. For example, the program can select product cells 7 from the main table 2, 14 in adjacent diagonal patterns as shown in FIG. 4, or the spaced diagonal pattern of the puzzle blank 34 in FIG. 6A and the diamond shaped pattern of the puzzle blank 36 in FIG. 6B.

In an embodiment of the present invention, in order to complete the puzzle, the user does not merely have to know the product of two numbers, but the user also has to recognize the common factors of certain numbers, which requires the ability to perform division. Thus, a forward and reverse type reasoning serves to reinforce the user's multiplication and division skills.

In an embodiment of the multiplication puzzle of the present invention, the user can link to the system by, for example, accessing the Internet through an Internet Service Provider (ISP). In this example, the user can access and launch the system of the present invention by entering the Uniform Resource Locator (URL) of the system in the title bar in the window of the ISP page. The system can also, for example, contain features to limit access to the system, such as features that require the user to register and include a security feature, wherein the user can enter a user identifier and password to login to the system.

With either the network option described above, or other options for operation, such as via local loaded software, the user is provided with selections for various options performable through the system. Such input and modifications are made, for example, via a graphical user interface (GUI). The screens of said GUI interface include, for example, the puzzle for completion by the user.

At any stage of the user's input, the user can return to the previous screen, select and deselect a table or an entry, repeat any of the above steps, save a completed or uncompleted puzzle or exit the system. Alternatively, after the user has completed the puzzle, the user can log out of the system.

The system of the present invention can also include an audio portion to provide entertainment to the user while the user is operating the system.

Figure 8:
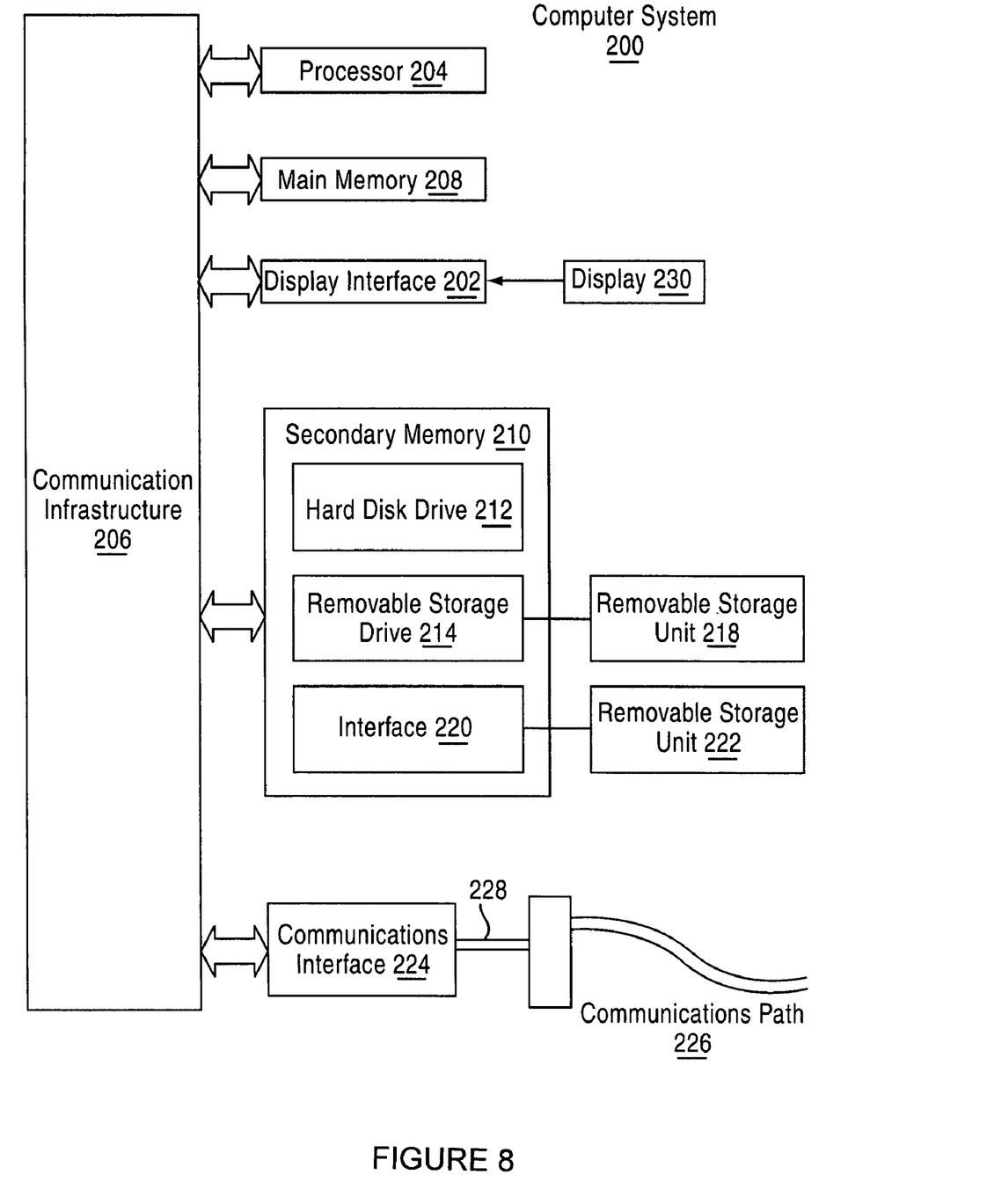
FIG. 8 illustrates a block diagram of various system components, in accordance with an embodiment of the present invention.

Access to the database and capabilities of the system of an embodiment of the present invention occur via hardware and access selections. As shown in FIG. 8 in an embodiment of the present invention, with one option, a user 40, can use locally loaded software at the user's terminal 41, such as a personal computer (PC), minicomputer, microcomputer, mainframe computer, telephone device, hand-held device such as a personal digital assistant (PDA), or other wireless device with a processor, display, and capability of connecting to a network 44, such as the Internet. The user 40 can use the terminal to access a server 43 via couplings 45, 46. The server 43 includes, for example, a PC, minicomputer, microcomputer, mainframe computer, or other device having a processor and a repository for data or connection to a repository for data. The couplings 45, 46 include, for example, wired, wireless, or fiberoptic connections. In another embodiment, the method and system of the present invention operate in a stand-alone environment, such as on a single terminal.

Figure 7:
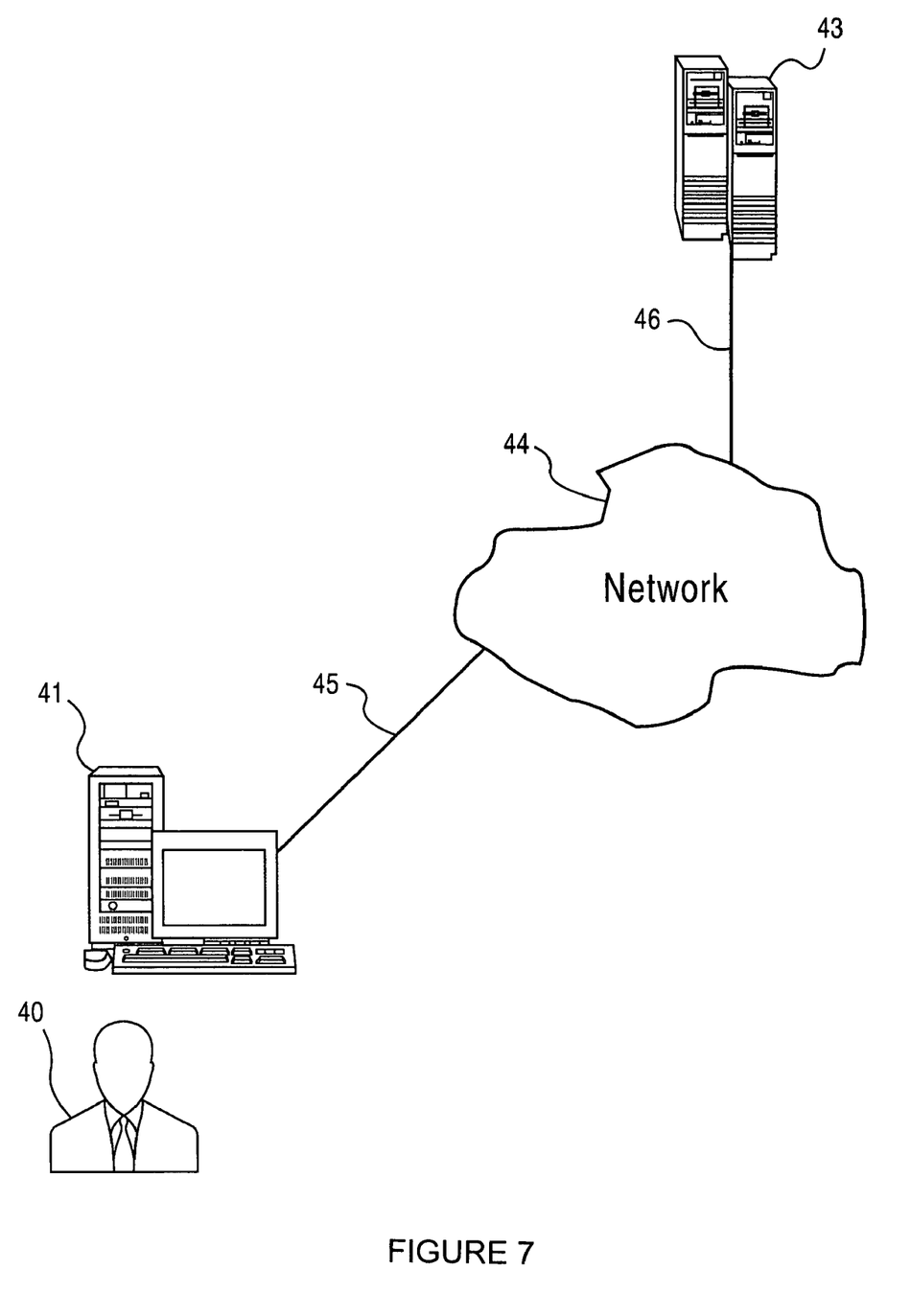
FIG. 7 is an example components diagram for a system, in accordance with an embodiment of the present invention.

The present invention may be implemented using hardware, software or a combination thereof and may be implemented in one or more computer systems or other processing systems. In an embodiment, the invention is directed toward one or more computer systems capable of carrying out the functionality described herein. An example of such a computer system 200 is shown in FIG. 7.

Computer system 200 includes one or more processors, such as processor 204. The processor 204 is connected to a communication infrastructure 206 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 200 can include a display interface 202 that forwards graphics, text, and other data from the communication infrastructure 206 (or from a frame buffer not shown) for display on the display unit 230. Computer system 200 also includes a main memory 208, preferably random access memory (RAM), and may also include a secondary memory 210. The secondary memory 210 may include, for example, a hard disk drive 212 and/or a removable storage drive 214, representing a floppy disk drive, a magnetic tape drive, an optical disk drive, etc. The removable storage drive 214 reads from and/or writes to a removable storage unit 218 in a well-known manner. Removable storage unit 218, represents a floppy disk, magnetic tape, optical disk, etc., which is read by and written to removable storage drive 214. As will be appreciated, the removable storage unit 218 includes a computer usable storage medium having stored therein computer software and/or data.

In alternative embodiments, secondary memory 210 may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred through communications interface 224 are in the form of signals 228, which may be electronic, electromagnetic, optical or other signals capable of being received by communications interface 224. These signals 228 are provided to communications interface 224 through a communications path (e.g., channel) 226. This path 226 carries signals 228 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 214, a hard disk installed in hard disk drive 212, and signals 228. These computer program products provide software to the computer system 200. The invention is directed to such computer program products.

Computer programs (also referred to as computer control logic) are stored in main memory 208 and/or secondary memory 210. Computer programs may also be received through communications interface 224. Such computer programs, when executed, enable the computer system 200 to perform the features of the present invention, as discussed herein. In particular, the computer programs, when executed, enable the processor 204 to perform the features of the present invention. Accordingly, such computer programs represent controllers of the computer system 200.

In an embodiment where the invention is implemented using software, the software may be stored in a computer program product and loaded into computer system 200 using removable storage drive 214, hard drive 212, or communications interface 224. The control logic (software), when executed by the processor 204, causes the processor 204 to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

In yet another embodiment, the invention is implements using office materials such as a writing implement, paper and a cutting device.

Although the invention has been described based upon these preferred embodiments, it would be apparent to those skilled in the art that certain modifications, variations, and alternative constructions would be apparent, while remaining within the spirit and scope of the invention. In order to determine the metes and bounds of the invention, therefore, reference should be made to the appended claims.

What is claimed is:

1. A method of making a multiplication and division puzzle, comprising the steps of:
   formulating a table having a plurality of cells arranged in rows and columns, of which there are a first row, a first column and a plurality of remaining cells to be filled,
   each of said plurality of remaining cells is located at an intersection of a respective column and a respective row,
   filling the cells of the first row with multipliers,
   filling the cells of the first column with multipliers,
   filling the remaining cells with products of respective row and respective column multipliers forming a main table filled with correct answers,
   providing a template having a plurality of cells which correspond in form to the plurality of cells in the main table, said template having a plurality of empty cells,
   forming a selection of cells for removal by selecting a plurality of cells of said template to remove which respectively correspond to cells of the main table,
   creating one opening or a plurality of openings in said template by removing said selection of cells forming a template with opening which has one or more openings; said template with opening also has a plurality of cells which were not removed,
   utilizing the template with opening to generate a puzzle blank,
   generating said puzzle blank by superimposing the template with opening over the main table such that the plurality of cells which were not removed conceal corresponding cells of the main table, said one opening or said plurality of openings revealing a plurality of products contained in a corresponding cells of the main table; said revealing forming a revealed products,
   said superimposing of said template with opening forming a puzzle blank having said revealed products,
   said revealed products forming a plurality of puzzle clues,
   converting the puzzle blank into a puzzle having said plurality of puzzle clues and a plurality of blank cells to be completed by a player's entry of an answer into a respective blank cell,
   said plurality of puzzle clues are each a correct answer at a respective puzzle clue's cell,
   said plurality of puzzle clues are visible to the user from an onset of play, and
   said plurality of puzzle clues are present in respective cells which contain said plurality of puzzle clues from the onset of play.

2. The method according to claim 1, wherein the steps of formulating the table, forming the template and generating the puzzle blank comprise writing and cutting means.

3. The method according to claim 1, wherein the step of formulating the table comprises combining a plurality of smaller identical tables.

4. The method according to claim 1, wherein the step of formulating the main table comprises selecting multipliers from the group comprising real numbers, positive numbers, negative numbers and algebraic quantities.

5. The method according to claim 1, wherein the step of formulating the table comprises randomly arranging the multipliers.

6. The method according to claim 1, wherein the step of formulating the table comprises sequentially arranging the multipliers.

7. The method according to claim 1, wherein the step of constructing the template with opening comprises removing the selection of cells in a pattern selected from the group comprising a diagonal shaped pattern and a rectangular shaped pattern.

8. The method according to claim 1, wherein the step of selecting said plurality of cells of said template to remove comprises randomly selecting said plurality of cells to remove.

9. The method according to claim 1, wherein the step of forming the template with opening comprises constructing a template having the same size as the main table.

10. The method according to claim 1, wherein the step of forming the template with opening comprises constructing a template having a smaller size than the main table.

11. The method according to claim 10, wherein the step of superimposing the template with opening over the main table comprises superimposing the template with opening over any group of cells in the main table.

12. A multiplication and division puzzle blank made by the method according to claim 1.

13. A system for generating a puzzle blank, comprising:
a means for formulating a table having a plurality of cells arranged in rows and columns, of which there are a first row, a first column and a plurality of remaining cells to be filled,
each of said plurality of remaining cells is located at an intersection of a respective column and a respective row,
a means for filling the cells of the first row with multipliers,
a means for filling the cells of the first column with multipliers,
a means for computationally filling the remaining cells with products of respective row and respective column multipliers forming a main table filled with correct answers,
a means for creating a template having a plurality of cells which correspond in form to the plurality of cells in the main table, said template having a plurality of empty cells,
a means for forming a selection of cells for removal by selecting a plurality of cells of said template to remove which respectively correspond to cells of the main table,
a means for creating one opening or a plurality of openings in said template by removing said selection of cells forming a template with opening which has one or more openings; said template with opening also has a plurality of cells which were not removed,
a means for utilizing the template with opening to generate a puzzle blank,
a means for superimposing the template with opening over the main table such that the plurality of cells which were not removed conceal corresponding cells of the main table, said one opening or said plurality of openings revealing a plurality of products contained in a corresponding cells of the main table; said revealing forming a revealed products,
said superimposing said template with opening forming a puzzle blank having said revealed products,
said revealed products forming a plurality of puzzle clues,
a means for converting the puzzle blank into a puzzle having said plurality of puzzle clues and a plurality of blank cells to be completed by a player's entry of an answer into a respective blank cell,
said plurality of puzzle clues are each a correct answer at a respective puzzle clue's cell,
said plurality of puzzle clues are visible to the user from an onset of play, and
said plurality of puzzle clues are present in respective cells which contain said plurality of puzzle clues from the onset of play.

14. The system for generating a puzzle blank according to claim 13, in which said means for computationally filling the remaining cells with products of respective row and respective column multipliers forming a main table uses a computation.

15. The system for generating a puzzle blank according to claim 13, wherein the system has a non-transitory computer readable medium on which a dataset is stored.

16. The method according to claim 1, further comprising a step of separating the puzzle blank from the template for the user to solve the puzzle.

17. The method according to claim 1, wherein the step of forming a template with opening further comprises cutting the template with a cutting device.

18. A method of making a multiplication and division puzzle, comprising the steps of
providing a computer system having a computer having a processing unit adapted for performing mathematical computations and said computer system adapted for input and output of data,
formulating a table having a table dataset which has at least a plurality of cell value data tangibly embodied in a non-transitory computer readable medium,
said table dataset having cell value data of a plurality of cells of said table, each of said plurality of remaining cells adapted for display at an intersection of a respective column and a respective row of said table when said table is displayed by a graphical user interface, said table having a first row, a first column,
filling the cells of the first row of said table with multipliers,
filling the cells of the first column of said table with multipliers,
said table having a plurality of remaining cells to be filled,
filling the remaining cells of said table with products of respective row and column multipliers forming a main table filled with correct answers and having a main table dataset,
said main table dataset having a plurality of main table cell value data,
generating a template having a template dataset which when displayed in rows and columns have cells that correspond in form to the plurality of cells in the main table,
said template dataset processed to produce a plurality of empty cells of said template,
generating a puzzle blank by executing machine readable instructions by said computer which computationally superimposes said template dataset data corresponding to said plurality of empty cells of said template against said main table dataset and determining which cells of said main table should have concealed values forming a puzzle blank,
said generating said puzzle blank revealing at least a plurality of products contained in a corresponding cells of the main table forming a puzzle blank having a revealed products,
said revealed products forming one puzzle clue or a plurality of puzzle clues,
computationally converting the puzzle blank into a puzzle having said plurality of puzzle clues and a plurality of blank cells to be completed by a player's entry of an answer into a respective blank cell, said plurality of puzzle clues are each a correct answer at a respective puzzle clue's cell, said plurality of puzzle clues are visible to the user from an onset of play, and said plurality of puzzle clues are present in respective cells which contain said plurality of puzzle clues from the onset of play.

19. A multiplication and division puzzle, produced by a method comprising the steps of:

formulating a table having a plurality of cells arranged in rows and columns, of which there are a first row, a first column and a plurality of remaining cells to be filled, each of said plurality of remaining cells is located at an intersection of a respective column and a respective row, filling the cells of the first row with multipliers, filling the cells of the first column with multipliers, filling the remaining cells with products of respective row and respective column multipliers forming a main table filled with correct answers, providing a template having a plurality of cells which correspond in form to the plurality of cells in the main table, said template having a plurality of empty cells, forming a selection of cells for removal by selecting a plurality of cells of said template to remove which respectively correspond to cells of the main table, creating one opening or a plurality of openings in said template by removing said selection of cells forming a template with opening which has one or more openings; said template with opening also has a plurality of cells which were not removed, utilizing the template with opening to generate a puzzle blank, generating said puzzle blank by superimposing the template with opening over the main table such that the plurality of cells which were not removed conceal corresponding cells of the main table, said one opening or said plurality of openings revealing a plurality of products contained in a corresponding cells of the main table; said revealing forming a revealed products, said superimposing of said template with opening forming a puzzle blank having said revealed products, said revealed products forming a plurality of puzzle clues, converting the puzzle blank into a puzzle having said plurality of puzzle clues, forming said multiplication and division puzzle, said multiplication and division puzzle having said plurality of puzzle clues and a plurality of blank cells to be completed by a player's entry of an answer into a respective blank cell, said plurality of puzzle clues are each a correct answer at a respective puzzle clue's cell, said plurality of puzzle clues are visible to the user from an onset of play, and said plurality of puzzle clues are present in respective cells which contain said plurality of puzzle clues from the onset of play.

* * * * *